United States Patent Office 2,892,807
Patented June 30, 1959

2,892,807

TREATED PIGMENTS AND METHOD OF PREPARING SAME

John W. Sellers, Akron, and Melvin P. Wagner, Barberton, Ohio, assignors to Columbia-Southern Chemical Corporation No Drawing. Application October 14, 1955
Serial No. 540,615

38 Claims. (Cl. 260—41.5)

This invention relates to compounded rubber stocks and more particularly to novel compositions of matter suitable for incorporation into rubber stocks and to the methods of producing these compositions.

It is known that silica in finely divided state is an effective rubber reinforcing pigment in that it usually increases modulus and tear strengths of the rubber. However, rubber compositions which are reinforced with siliceous pigments commonly have been much inferior as to wear resistance than corresponding compositions reinforced with the best carbon black. As a consequence, siliceous pigments are rarely used in tire treads and other places where high abrasion is important.

According to the present invention, a novel type of siliceous pigment has been provided which, when incorporated in rubber, produces products which have improved wear resistance and improved tensile, tear and modulus properties. Such novel siliceous pigments are obtained by treating a specially prepared siliceous material having special properties, as hereinafter set forth, with an organic coating agent of the group consisting of lactones, triazine compounds and epoxides.

According to a further embodiment of this invention, a novel rubber composition of high tensile strength has been provided by forming a mixture of an organic coating agent of the group just mentioned, a siliceous pigment of the type herein contemplated and a vulcanizable rubber, such as GR-S or natural rubber, and vulcanizing the product.

The specially prepared siliceous pigment employed may be a finely divided hydrated silica which contains bound water (as hereinafter defined) corresponding to the composition $$H_2O \cdot (SiO_2)_x$$

where $x$ is a number (including fractional numbers) between 3 and 85, and which also has an average ultimate particle size below 0.1 (preferably about 0.01 to 0.5) micron and normally has a surface area of 25 to 250 square meters per gram. Such silica should contain above 50, preferably at least 75, percent by weight of $SiO_2$ on a completely water-free basis (free of both bound and free water). Silica of this type should contain less than about 2 percent by weight, preferably less than 1 percent by weight, of free $Na_2O$ in a form which is titratable by acids at a pH above 7. However, the silica may contain combined $Na_2O$ which is in a form such that it does not readily titrate with acids, for example, $Na_2O$ combined in sodium aluminate or alumina silicate. The pigment also may contain substantial amounts of various oxides, such as alkaline earth metals (e.g., calcium, barium, strontium or magnesium), or aluminum or zinc, in chemical combination or association. However, the sum of such oxides should not exceed about 1 mole per 10 moles of $SiO_2$. By far the best results have been obtained using materials in which the $SiO_2$ concentration is in excess of 75 percent by weight on the anhydrous basis and the surface area of the silica is 75 to 200 square meters per gram.

Organic coating agents of the type suitable for this invention are numerous and varied. For example, triazine-type compounds having the general formula

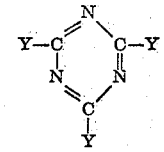

where Y is a halogen, hydrocarbon group usually containing less than 10 carbon atoms, —OR, —NR$_2$, or —SR, R being hydrogen or a hydrocarbon group usually containing less than 10 carbon atoms, are particularly suitable for the present invention. Of these, N,N-diallylmelamine, esters of cyanuric acid, such as triallyl cyanurate, or the corresponding esters of ethyl, propyl, n-butyl, t-butyl, propargyl, benzyl, oleyl and stearyl alcohols, melamine, ammeline, ammelide and cyanuric acid are preferred.

Epoxy-compounds, such as styrene oxide, ethylene oxide, butylene oxide, allylglycidyl ether, propylene oxide, butadiene monoxide, or like 1,2-epoxides, also enhance the reinforcing characteristics of the siliceous pigments of the present invention.

Of the lactones useful in the instant invention are γ-butyrolactone, β-propiolactone, γ-valerolactone, α-valerolactone, γ-caprolactone, etc.

The methods for applying the organic coating agents of the present invention to finely divided siliceous material are varied. The application is advantageously performed prior to incorporation of the siliceous pigment into the rubber. One method of contacting siliceous material with organic coatings comprises introducing the coating into a mixture of the siliceous pigment and an inert organic solvent, such as toluene, acetone, petroleum ether, etc. It will be obvious from subsequent disclosure that numerous ratios, concentrations and reaction conditions may be employed.

Instead of using organic solvents as media for the slurries, it is at times advantageous to make a water slurry of the siliceous pigment and to homogenize the coating material therewith.

According to a still further method, siliceous pigment in a dry state (usually containing some water of hydration) is tumbled, while a gas, such as nitrogen, which is saturated with the coating agent, particularly the more volatile coating agents, is passed through the tumbling body of siliceous materials.

Another suitable method consists in adding a small amount of siliceous material to a relatively large portion of the coating agent to produce a mixture containing 20 percent or more of the agent by weight of the total mixture. This highly concentrated mixture may be blended by tumbling or by other means with uncoated siliceous pigment.

Coatings such as some of the epoxides are best applied to the pigment in a nickel or stainless steel bomb, i.e., the desired mixture of coating agent and pigment is made up, placed in a bomb and heated to a temperature ranging from about 100° C. to 350° C., preferably about 200° C.

Another convenient method of applying these coating agents to finely divided siliceous material comprises spraying a liquid coating agent, per se, or the liquid agent in a solvent, onto the pigment with agitation and drying of the mixture at 110° C.

Although it is not known how the reaction proceeds or just what accounts for the improved reinforcing properties of the coated pigment, modulus, tensile, tear and abrasion values are significantly better when coated pigments are used in preference to uncoated pigments as shown hereinbelow. There is evidently strong bonding between the organic coating agent and the siliceous material. The reaction product or coated product, therefore, when incorporated in rubber probably affords a second strongly-bonding property between the rubber and the treated pigment.

Siliceous pigments of the quality required for the present invention may be prepared in a number of ways. Finely-divided silica in pigmentary form having surface areas in the range of 25 to 250 square meters per gram and an average ultimate particle size below 0.1 micron has been prepared by a precipitation method which involves reacting an aqueous solution of an alkali metal silicate such as sodium silicate with an acid. By carefully controlling the concentration of the reactants, the temperature conditions, the rate of addition of acid, etc., as herein contemplated, it is possible to precipitate a product having finely-divided, discrete particles as compared to the gel resulting from processes commonly known in the art.

This precipitation method consists, more particularly, in adding an acid to an alkali metal silicate having a predetermined concentration. It is at times advantageous that the alkali metal silicate contain a certain concentration of sodium chloride or other alkali metal salt admixed therewith. The acid is added to the silicate solution since the rate of neutralization of the alkali metal silicate is important. For instance, were the silicate solution to be added to an excess of acid, the former would be neutralized too rapidly and the conventional gel would be produced. The rate of admixing the acid to the silicate solution is determined by several factors.

Thus, where a solution of $Na_2O \cdot (SiO_2)_{3.3}$ containing 28 grams of $SiO_2$ per liter and 20.7 grams per liter of NaCl was treated with carbon dioxide at 25° C., the product had a surface area of 344 square meters per gram when the slurry was carbonated to a pH of 7 in 20 minutes. On the other hand, when this time of acidification was increased to 1440 minutes, the surface area fell to 166, a more desirable surface area. Moreover, by increasing the NaCl content to 53.9 grams per liter, a pigment having a surface area of 112.5 square meters per gram can be obtained with only 20 minutes acidification at 25° C. Thus, the rate of acidification may range from 5 to 2880 minutes or longer, so long as the other conditions are properly adjusted.

The surface areas mentioned herein have been measured by the Brunauer-Emmett-Teller (B.E.T.) method which is described in the Journal of the American Chemical Society, volume 60, page 309 (1938).

When the alkali metal silicate used in preparing a finely divided pigment is sodium silicate, it should normally have the composition $Na_2O(SiO_2)_x$, where $x$ is at least 2, usually 2 to 4, including fractional numbers, preferably in the range of 3 to 4. The silicate solution generally contains 10 to 100 grams of $SiO_2$ per liter.

The rate of acid addition is important, as previously stated, and is dependent on the concentration of the other reactants. Precipitation usually begins after about 30 percent of the acid required to react with the $Na_2O$ content of the alkali metal silicate and produce the sodium salt thereof has been added and is usually complete after 50 to 70 percent of the theoretical amount of acid has been added. Any convenient rate may be employed to neutralize the remaining acidic material when precipitation has ceased. Although it has been found preferable to conduct the acidification of the silicate using carbon dioxide or an acid salt thereof, such as sodium bicarbonate, other acids which may be used include: hydrochloric acid, sulfuric acid, phosphoric acid, sulfurous acid, nitric acid, as well as the acid or partially neutralized alkali metal salts of such acids such as sodium bicarbonate, ammonium bicarbonate, sodium acid sulfate, disodium acid phosphate and the like.

Upon acidification of the alkali metal silicate a slurry results containing finely divided particles of silica which are present in essentially agglomerated and filterable form. When carbon dioxide is used to react with the alkali metal silicate solution, as hereinabove described, a silica slurry results containing up to about 3 percent by weight of $Na_2O$ combined therewith and/or up to about 7 or 8 percent by weight of polyvalent cations such as calcium, aluminum, magnesium or the like, as well as appreciable amounts (0.5 to 5 percent by weight) of anions due to the presence of alkali metal salts, such as sodium carbonate, sodium bicarbonate, sodium chloride, etc.

The removal of these ions from the silicate is quite difficult. While washing and acid extraction will effect such a purification, the silica filters and settles out so slowly that large amounts of equipment are necessary.

As disclosed in an application of Kissling et al., Serial No. 374,432, filed August 14, 1953, the entire disclosure of which is incorporated herein by reference, such filterable silica may be purified by mixing in the presence of water with an ion exchange resin in pulverulent form but having a particle size substantially larger than that of the silica subjected to treatment, selectively separating the resin from the resulting silica slurry and then recovering the treated silica essentially free from resin. Cations may be thus removed when mixing the silica with the acidic form of a cation exchange resin in amount sufficient to reduce the pH of the resulting silica slurry below 5, preferably in the range of 1 to 4. Numerous methods may be used to separate the resin from the silica particles, among which are decantation, filtration, centrifugation and settling.

Various types of carbonaceous ion exchange resins may be used. Typical types which are useful are those produced by the sulfonation of polystyrene and copolymers of styrene with vinyl benzene. See for example U.S. Patent 2,631,127. Other sulfonated insoluble materials of high molecular weights such as sulfonated phenol-formaldehyde resin, sulfonated lignin or peat, or the like, may be used.

Anion exchange resins useful for the purpose herein contemplated include the amino and like nitrogenous resins such as those derived from styrene and its copolymers. See for example U.S. Patent 2,591,573.

Example II, infra, discloses a particular embodiment of the Kissling et al. purification process.

Precipitated silica having the properties set forth above may be prepared by still another method. Thus, by reacting a finely divided alkaline earth metal silicate, such as calcium silicate having an average ultimate particle size below 0.1 micron, with an acid having an anion which forms a water soluble salt with the alkaline earth metal, a siliceous pigment having properties especially suited for coating with the coating agent of the present invention is prepared.

In the preparation of this pigment, calcium silicate in an aqueous medium is treated with sufficient acid to decompose it, leaving a maximum of 6 percent calcium in the silica pigment, the calcium being computed as CaO. Proper concentrations of CaO in the resulting product may be achieved by reducing the pH of the aqueous calcium silicate solution to below about 5, usually in the range of 3 to 5. Inasmuch as the silica produced by the process just described is present in a slurry and is difficult to recover therefrom because it does not settle or filter rapidly, it has been found expedient to increase the pH of the slurry above 5, usually in the 7 to 8.5 range. The increase in pH affords a two-fold benefit in that it facilitates separation and recovery by settling and/or filtration of the silica and it decreases the surface area to a more practical and desirable surface area. The pH may be increased by adding an alkali such as sodium hydroxide or other like alkali metal hydroxide to the resultant slurry.

Calcium silicates having an average ultimate particle size below 0.1 micron are best prepared by reacting calcium chloride with alkali metal silicate in aqueous medium containing sodium chloride or like alkali metal chloride. The sodium chloride conveniently may be in the calcium chloride solution although it may also be in the sodium silicate solution. Thus, it is found most desirable to react aqueous sodium silicate with an aqueous calcium chloride solution containing sodium chloride, preferably in the proportion of at least 0.1 pound, and usually in the range of 0.2 to 0.5 pound, of sodium chloride per pound of calcium chloride. It has been found that the presence of sodium chloride materially improves the character of the pigment.

Although a wide range of concentrations of the alkali metal silicate and the calcium chloride solutions may be employed, excellent pigments result when a sodium silicate solution containing in excess of 20 grams of $SiO_2$ per liter, usually in the range of 50 to 150 grams per liter of $SiO_2$, and a calcium chloride solution containing at least 20 grams of calcium chloride per liter, usually in the range of 50 to 150 grams per liter, are used.

The amount of calcium chloride is generally in stoichiometric excess of the sodium silicate. Although a slight excess of sodium silicate is tolerable, it is best to have at least a stoichiometric amount of calcium chloride present during the reaction.

Another important factor in this reaction is the mode of mixing the reactants, since it is very desirable that the reactants be thoroughly intermixed. An efficient method for accomplishing this high degree of intermixing is to introduce the aqueous streams into a centrifugal pump, thereby creating an excellent turbulence at the point of mixing. Better agitation is realized if the pump is not operated to capacity. If, for instance, the pump is capable of discharging 100 gallons per minute with unlimited flow of liquid to the pump, the amount of reacting solution supplied to the pump is held at least 10 percent below and usually 35 percent or more below this amount. By so doing, not only is better mixing accomplished, but the character of the resulting calcium silicate is improved.

To ensure production of the calcium silicate in a highly finely divided state, alkali metal silicate having the composition $Na_2O(SiO_2)_x$, where $x$ is a number not less than 2 nor more than 4, is preferably used. This results in the production of a calcium silicate having the composition $CaO(SiO_2)_x$, where $x$ is as defined above. However, other calcium silicates wherein $x$ is higher or lower may be used in certain cases. When calcium silicate prepared in the fashion just described is treated with a mineral acid, in the manner disclosed above, a dry, powdered silica in extremely fine state of division is produced. This silica normally contains above 75 percent $SiO_2$, the usual range being about 78–88 percent $SiO_2$.

The siliceous pigments produced by the various methods hereinabove described contain "bound water" and "free water." The term "free water" denotes water which may be removed from the silica pigment by heating the pigment at a temperature of 105° C. for a period of 24 hours in a laboratory oven. The term "bound water" is intended to mean the amount of water which is driven off from the siliceous pigment by heating the pigment at ignition temperature, for example, 1000° C. to 1200° C., until no further water can be removed, minus the amount of free water in the pigment.

The amount of bound and free water in the silica herein contemplated is determined by the temperature of drying. Where the precipitated silica has been dried at a relatively low temperature, for example, 100° C. to 150° C., the silica contains bound water in the proportion of about 3 to 8 moles (normally about 6 moles) of $SiO_2$ per mole of bound water, and from about 2 to 10 percent of free water based upon the weight of the pigment.

In order to illustrate several methods for preparing silica having the required properties for use in this invention, the following examples are given. Unless otherwise specified, percentages are given by weight in these examples.

*Example I*

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 167° F. plus or minus 5°. Carbon dioxide gas containing 10.0 to 10.8 percent $CO_2$, the balance being nitrogen and air, is introduced into the solution at a gas temperature of 115° F. to 145° F. at a rate sufficient to provide 1250 cubic feet of the carbon dioxide gas per minute (measured at 760 millimeters pressure and 0° C.). This gas is introduced directly under a turbo agitator in a manner to achieve uniform distribution of gas, and the mixture is vigorously agitated. Carbon dioxide introduction is continued at this rate for 8½ hours, at which time about 120 to 140 percent of the theoretical amount of $CO_2$ has been introduced. After this period of 8½ hours, the rate of introduction of carbon dioxide is reduced to 400 cubic feet per minute and the solution is boiled for 1½ hours. The slurry is then treated with sufficient HCl to lower the pH to 7, after which the slurry is filtered, and the filter cake washed and dried. The resulting silica has a surface area of 140 to 150 square meters per gram.

*Example II*

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 167° F. plus or minus 5°. Carbon dioxide gas containing 10.0 to 10.8 percent $CO_2$, the balance being nitrogen and air, is introduced into the solution at a gas temperature of 115° F. to 145° F. at a rate sufficient to provide 1250 cubic feet of the carbon dioxide gas per minute (measured at 760 millimeters pressure and 0° C.). This gas is introduced directly under a turbo agitator in a manner to achieve uniform distribution of gas, and the mixture is vigorously agitated. Carbon dioxide introduction is continued at this rate for 8½ hours, at which time about 120 to 140 percent of the theoretical amount of $CO_2$ has been introduced. After this period of 8½ hours, the rate of introduction of carbon dioxide is reduced to 400 cubic feet per minute and the solution is boiled for 1½ hours.

The resulting silica has a surface area of about 140 to 150 square meters per gram and is in the form of porous flocs of particles.

The resulting silica slurry has a pH of about 9.9, is filtered and the filter cake washed twice with water. The final filter cake contains about 20 percent by weight of solids. A sulfonated polystyrene cation exchanger in the acid form having a particle size of 16 to 70 mesh is mixed with the filter cake in the proportion of 5 grams of filter cake per gram of resin. Enough water is added to reduce the silica solids content to about 15 percent by weight on the basis of the silica and water in the mixture. Upon stirring the mixture thins out to a fluid slurry. The resin is allowed to settle out and the slurry having a pH of about 2.0 is spray-dried.

*Examples III*

A 90-liter autoclave kettle provided with a heating and cooling coil, an agitator and a metal thermometer was charged with 12,850 grams of sodium silicate solution containing 976 grams of $Na_2O$ and 3115 grams of $SiO_2$. The solution was diluted to 48 liters total volume and the temperature raised to 95° C. The solution was carbonated with 100 percent $CO_2$ and a carbonation rate was used such as to introduce the theoretical amount of $CO_2$ in about 30 minutes. Carbonation was continued at this rate for about 1 hour at the end of which time the pH of the slurry was 9.85.

The resulting slurry was filtered and washed twice with hot tap water. The filter cake was reslurried and adjusted to a pH of 6.75 by adding 400 cc. of 3.5 N HCl thereto. The acidified slurry was then filtered and the filter cake washed nearly chloride-free with hot tap water, after which the precipitate was dried at 105° C. in a forced draft laboratory oven, then micropulverized, conditioned at 50 percent relative humidity and 73.5° F. overnight. The finished pigment had a pH of 8.2 and contained 0.61 percent sodium. Its B.E.T. surface area was 148 square meters per gram.

It has been found that the silica can be filtered more easily when the slurry is alkaline and hence, in general, it is desirable that the pH of the slurry be, say, 7 to 9 at the time it is filtered. However, superior dispersion results with pigments obtained from acidic slurries having a pH of 3 to 6.5. An effective compromise may be had by working at slurry pH values between 5 and 8.

*Example IV*

Streams of aqueous sodium silicate solution containing 100 grams per liter of $SiO_2$ as $Na_2O(SiO_2)_{3.36}$, calcium chloride solution containing 100 grams per liter of $CaCl_2$ and 30 to 40 grams per liter of sodium chloride were fed directly into the central area of a centrifugal pump at 150° F. The rates of flow were adjusted so that calcium chloride was approximately 10 percent in excess over the stoichiometric quantity required for reaction and so that the amount of liquid supplied to the pump was about 25 percent below the output capacity of the pump. In consequence, the solutions were subjected to turbulent intermixing in the pump.

The slurry of calcium silicate thus produced was introduced into a tank and sufficient hydrochloric acid solution containing 28 percent by weight HCl was added, with stirring, to reduce the pH of the slurry to 2. Thereupon, sufficient sodium hydroxide solution containing 40 percent by weight of NaOH was added to raise the pH of the slurry to 7.5. The precipitated silica was recovered by decantation and filtration and was dried in an oven at a drying temperature of 120–140° C. for 12 hours. The free water content of the product was within the range of 3 to 8 percent by weight of the pigment.

It will be noted that the silica pigments may be prepared from materials other than calcium silicate. Thus, finely divided precipitated magnesium silicate, barium silicate or strontium silicate, as well as silicates of zinc or other metals of series 3 to 8, group II, of the periodic table, which have the surface area properties roughly approximating those set forth with respect to calcium silicate, may be subjected to treatment with water soluble acids according to this invention in order to extract the metals and produce the herein contemplated pigment. In such a case, the magnesium or like silicate preferably is prepared as described above by reaction of metal chloride solution containing at least 0.1 pound of sodium chloride per pound of metal chloride.

The siliceous pigments prepared as in the examples above may be treated with coating agents of the type mentioned above.

The following are examples of typical methods of treating the siliceous pigments with the coating agents herein contemplated.

*Example V*

600 grams of a pigment prepared as in Example I was slurried with 3500 milliliters of acetone in a 5-liter, 3-necked flask equipped with a heated dropping funnel and a mechanical stirrer (forced air cooled). 60 grams of N,N-diallylmelamine (melting point 144–145° C.) was dissolved in 600 milliliters of hot (50° C.) acetone and added to the well-agitated pigment slurry by means of the dropping funnel over a one (1) hour period. The mixture was heated on a steam bath, while being stirred rapidly, until 2115 milliliters of acetone had been removed. An additional 375 milliliters was removed without stirring. The contents of the flask were then heated under reduced pressure, using an aspirator. When little solvent appeared, the drying process was continued overnight in a germination box in which the silica remained above 30° C., and completed in an oven at 105° C. (182 hours). Yield after 2 days' storage under room conditions was 637 grams of coated pigment, there being a 10 percent by weight coating thereon. This material was then micropulverized.

*Example VI*

Into a 1-liter, 3-necked flask equipped with stirrer, dropping funnel, thermometer and drying tube were charged 100 grams of pigment prepared as in Example I and 400 milliliters of acetone. While continuously stirring, 72 grams (1 M) of β-propiolactone (97 percent by weight purity) was slowly added over a 25-minute period. The mixture was stirred for 6 hours after the addition and then allowed to stand for 4.5 days. It was then filtered, washed twice with 200 milliliter portions of acetone. The coated pigment was dried at 110° C. for 19 hours and then micropulverized. It contained 4.38 percent by weight (on the silica basis) of coating thereon.

*Example VII*

Ten grams of pigment prepared as in Example II and 35 grams of butene-2-oxide were charged into a glass-lined bomb, sealed and heated 8 hours at 100° C. After cooling, the bomb was opened, the contents filtered and the treated pigment was washed twice with acetone. The product was dried at 100° C. and 5 millimeters (mercury) pressure. The coated pigment had 4.27 percent by weight (on silica basis) of coating thereon.

Samples of treated pigment as prepared in Examples V–VII and samples of untreated finely-divided siliceous pigments as prepared in Examples I–IV were conditioned at 23.7° C. and 50 percent relative humidity for at least 24 hours and were formulated according to the following recipe:

|  | Parts by weight | Parts by weight |
| --- | --- | --- |
| Natural rubber smoked sheet | 100.0 | 100.0 |
| ZnO | 5.0 | 5.0 |
| Sulfur | 3.0 | 3.0 |
| Stearic acid | 3.0 | 3.0 |
| Phenyl beta naphthylamine | 1.0 | 1.0 |
| Altax (benzothiazyl disulfide) | 0.8 | 0.8 |
| D.O.T.G. (Di-ortho-tolylguanidine) | 1.2 | 1.2 |
| Triethanolamine | 0.5 | 0.5 |
| Treated pigment | 58.5 |  |
| Untreated pigment |  | 58.5 |

The treated and untreated pigments having thus been compounded were submitted to standard rubber tests for comparison. The reinforcing properties of treated pigment were significantly better than those of untreated pigment. There were manifest improvements in the modulus tensile, tear and abrasion values of rubber containing treated pigment.

The siliceous pigment coated as herein contemplated may be used in various rubber compositions, including natural rubber, butadiene-styrene copolymers, known as GR–S rubber, which are copolymers of 10 to 60 percent by weight of styrene and 90 to 40 percent by weight of butadiene, butadiene-acrylonitrile copolymers derived by copolymerization of 40 to 90 percent by weight of butadiene with 60 to 10 percent by weight of acrylonitrile, neoprene rubber, isobutylene polymers and copolymers of isobutylene with 0.01 to 4 percent by weight of isoprene (based upon the weight of isobutylene) or other elastomers, such as polyurethane elastomers, or those prepared by polymerization of butadiene-1,3, isoprene, piperylene, 2,3-dimethyl butadiene, 2-chlorobutadiene-1,3 or other comparable polymerizable compound alone or in copolymerized mixture with one or more organic monomeric ethylenic compounds, including acrylonitrile, vinyl chloride, vinyl acetate, styrene, methyl methacrylate, methyl alpha chloroacrylate, methyl acrylate, and the like.

Other synthetic rubber-like polymers and copolymers of butadiene, or like diolefin, also may be used.

According to a further embodiment herein contemplated, the rubber and untreated siliceous pigment may be milled together with the coating agent and with conventional vulcanizing and other compounding ingredients without pre-reacting the silica with the agent. In such a case, after vulcanization of the composition thus obtained, an improved rubber is obtained.

The proportion of coating agent used normally, according to the present invention, ranges from 1 to 20 percent by weight based on the weight of the siliceous pigment. The proportion of siliceous pigment normally ranges from 15 to 90 parts by weight per 100 parts by weight of the rubber.

The expression "finely-divided siliceous pigment" used herein is intended to distinguish over gel-like material.

Although the present invention has been described with reference to the specific details of certain embodiments, it is not intended that such embodiments shall be regarded as limitations upon the scope of the invention, except insofar as included in the accompanying claims.

We claim:

1. A composition which comprises a rubber of the group consisting of natural rubber, butadiene-styrene copolymers, butadiene-acrylonitrile copolymers, 2-chlorobutadiene polymers and isobutylene polymers, a finely-divided siliceous pigment having an average ultimate particle size below 0.1 micron, said pigment being treated with a lactone.

2. A composition which comprises a rubber and 20 to 80 parts by weight of a finely-divided hydrated silica per 100 parts by weight of rubber, which silica contains at least 75 percent $SiO_2$ on the water-free basis and bound water in an amount corresponding to the formula $H_2O \cdot (SiO_2)_x$, where $x$ is 3 to 85, and a surface area of 25 to 250 square meters per gram and an average ultimate particle size below 0.1 micron, said silica being treated with a triazine.

3. A composition which comprises a rubber and 20 to 80 parts by weight of a finely-divided hydrated silica per 100 parts by weight of rubber, which silica contains at least 75 percent $SiO_2$ on the water-free basis and bound water in an amount corresponding to the formula $H_2O \cdot (SiO_2)_x$, where $x$ is 3 to 85, and a surface area of 25 to 250 square meters per gram and an average ultimate particle size below 0.1 micron, said silica being treated with a lactone.

4. A composition which comprises a rubber of the group consisting of natural rubber, butadiene-styrene copolymers, butadiene-acrylonitrile copolymers, 2-chlorobutadiene polymers and isobutylene polymers, and a finely-divided hydrated siliceous pigment which has a surface area of 25 to 250 square meters per gram and an average ultimate particle size below 0.1 micron, said siliceous pigment being treated with a lactone.

5. A composition which comprises a rubber of the group consisting of natural rubber, butadiene-styrene copolymers, butadiene-acrylonitrile copolymers, 2-chlorobutadiene polymers and isobutylene polymers, a finely-divided hydrated silica which contains at least 75 percent $SiO_2$ on the water-free basis and bound water in an amount corresponding to the formula $H_2O \cdot (SiO_2)_x$, where $x$ is 3 to 85, and which has a surface area of 25 to 250 square meters per gram and an average ultimate particle size below 0.1 micron, said silica being treated with a lactone.

6. A composition which comprises a rubber of the group consisting of natural rubber, butadiene-styrene copolymers, butadiene-acrylonitrile copolymers, 2-chlorobutadiene polymers and isobutylene polymers, a finely-divided hydrated siliceous pigment having an average ultimate particle size below 0.1 micron, said pigment being treated with a triazine.

7. A composition which comprises a rubber of the group consisting of natural rubber, butadiene-styrene copolymers, butadiene-acrylonitrile copolymers, 2-chlorobutadiene polymers and isobutylene polymers, and a finely-divided hydrated siliceous pigment which has a surface area of 25 to 250 square meters per gram and an average ultimate particle size of below 0.1 micron, said siliceous pigment being treated with a triazine.

8. A composition which comprises a rubber of the group consisting of natural rubber, butadiene-styrene copolymers, butadiene-acrylonitrile copolymers, 2-chlorobutadiene polymers and isobutylene polymers, and a finely-divided hydrated silica which contains at least 75 percent $SiO_2$ on the water-free basis and bound water in an amount corresponding to the formula $H_2O \cdot (SiO_2)_x$, where $x$ is 3 to 85, and which has a surface area of 25 to 250 square meters per gram and an average ultimate particle size below 0.1 micron, said silica being treated with a triazine.

9. A composition which comprises a rubber of the group consisting of natural rubber, butadiene-styrene copolymers, butadiene-acrylonitrile copolymers, 2-chlorobutadiene polymers and isobutylene polymers, and 20 to 80 parts by weight of finely-divided hydrated silica per 100 parts by weight of rubber, which silica contains at least 75 percent $SiO_2$ on the water-free basis and bound water in an amount corresponding to the formula $H_2O \cdot (SiO_2)_x$, where $x$ is 3 to 85, and a surface area of 25 to 250 square meters per gram and an average ultimate particle size below 0.1 micron, said silica being treated with N,N-diallylmelamine.

10. A composition which comprises a rubber of the group consisting of natural rubber, butadiene-styrene copolymers, butadiene-acrylonitrile copolymers, 2-chlorobutadiene polymers and isobutylene polymers, and 20 to 80 parts by weight of finely-divided hydrated silica per 100 parts by weight of rubber, which silica contains at least 75 percent $SiO_2$ on the water-free basis and bound water in an amount corresponding to the formula $H_2O \cdot (SiO_2)_x$, where $x$ is 3 to 85, and a surface area of 25 to 250 square meters per gram and an average ultimate particle size below 0.1 micron, said silica being treated with beta-propiolactone.

11. The method of producing a siliceous pigment suitable as a rubber-reinforcing pigment which comprises mixing a lactone with a finely-divided, hydrated precipitated siliceous pigment having a surface area of 25 to 250 square meters per gram and an average ultimate particle size below 0.1 micron, which pigment contains at least 75 percent by weight of $SiO_2$ on a water-free basis and bound water in an amount corresponding to the formula $H_2O \cdot (SiO_2)_x$, where $x$ is 3 to 85.

12. The method of producing a siliceous pigment suitable as a rubber-reinforcing pigment which comprises applying a lactone to a finely-divided, hydrated, precipitated silica having an average ultimate particle size below 0.1 micron and a surface area of 25 to 250 square meters per gram.

13. The method of claim 11 in which the lactone is beta-propiolactone.

14. The method of producing a siliceous pigment suitable as a rubber-reinforcing pigment which comprises mixing a triazine with a finely-divided, hydrated, precipitated siliceous pigment having a surface area of 25 to 250 square meters per gram and an average ultimate particle size below 0.1 micron, which pigment contains at least 75 percent by weight of $SiO_2$ on a water-free basis and bound water in an amount corresponding to the formula $H_2O \cdot (SiO_2)_x$, where $x$ is 3 to 85.

15. The method of claim 14 wherein the triazine compound has the general formula

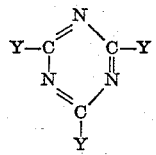

where Y is selected from the group consisting of a halogen, a hydrocarbon, —OR, —$NR_2$, and —SR and R is selected from the group consisting of hydrogen and hydrocarbon.

16. The method of producing a siliceous pigment suitable as a rubber-reinforcing pigment which comprises applying a triazine to a finely-divided, hydrated, precipitated silica having a surface area of 25 to 250 square meters per gram and an average ultimate particle size below 0.1 micron.

17. The method of claim 14 in which the triazine compound is N,N-diallylmelamine.

18. The method which comprises treating with a lactone a finely-divided hydrated silica having an average ultimate particle size below 0.1 micron and a surface area of 25 to 250 square meters per gram and milling the treated product in a rubber of the group consisting of natural rubber, butadiene-styrene copolymers, butadiene-acrylonitrile copolymers, 2-chlorobutadiene polymers and isobutylene polymers.

19. The method which comprises treating with a triazine a finely-divided hydrated silica having an average ultimate particle size below 0.1 micron and a surface area of 25 to 250 square meters per gram and milling the treated product in a rubber of the group consisting of natural rubber, butadiene-styrene copolymers, butadiene-acrylonitrile copolymers, 2-chlorobutadiene polymers and isobutylene polymers.

20. The method which comprises milling together a rubber of the group consisting of natural rubber, butadiene-styrene copolymers, butadiene-acrylonitrile copolymers, 2-chlorobutadiene polymers and isobutylene polymers, a finely-divided hydrated silica which contains at least 75 percent $SiO_2$ on the water-free basis and bound water in an amount corresponding to the formula $H_2O \cdot (SiO_2)_x$, where $x$ is 3 to 85, and which has a surface area of 25 to 250 square meters per gram and an average ultimate particle size below 0.1 micron, and a triazine.

21. The method which comprises milling together a rubber of the group consisting of natural rubber, butadiene-styrene copolymers, butadiene-acrylonitrile copolymers, 2-chlorobutadiene polymers and isobutylene polymers, a finely-divided hydrated silica which contains at least 75 percent $SiO_2$ on the water-free basis and bound water in an amount corresponding to the formula $H_2O \cdot (SiO_2)_x$, where $x$ is 3 to 85, and which has a surface area of 25 to 250 square meters per gram and an average ultimate particle size below 0.1 micron, and a lactone.

22. The reaction product of a finely-divided, hydrated, precipitated siliceous pigment having an average ultimate particle size below 0.1 micron and a lactone.

23. The reaction product of a finely-divided, hydrated, precipitated siliceous pigment having an average ultimate particle size below 0.1 micron and a triazine.

24. The reaction product of a finely-divided, hydrated, precipitated silica having a surface area of 25 to 250 square meters per gram and an average ultimate particle size below 0.1 micron and a lactone.

25. The reaction product of a finely-divided, hydrated, precipitated silica having a surface area of 25 to 250 square meters per gram and an average ultimate particle size below 0.1 micron and a triazine.

26. The reaction product of a finely-divided, hydrated, precipitated silica which contains at least 75 percent $SiO_2$ on the water-free basis and bound water in an amount corresponding to the formula $H_2O \cdot (SiO_2)_x$, where $x$ is 3 to 85, and which has a surface area of 25 to 250 square meters per gram and an average ultimate particle size below 0.1 micron, and a lactone.

27. The reaction product of a finely-divided, hydrated, precipitated silica which contains at least 75 percent $SiO_2$ on the water-free basis and bound water in an amount corresponding to the formula $H_2O \cdot (SiO_2)_x$, where $x$ is 3 to 85, and which has a surface area of 25 to 250 square meters per gram and an average ultimate particle size below 0.1 micron, and a triazine.

28. The reaction product of claim 27 wherein the triazine has the general formula

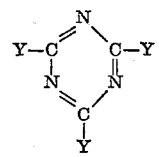

where Y is selected from the group consisting of a halogen, a hydrocarbon, —OR, —$NR_2$, and —SR and R is selected from the group consisting of hydrogen and hydrocarbon.

29. The reaction product of a finely-divided, hydrated, precipitated siliceous pigment having an average ultimate particle size below 0.1 micron and beta-propiolactone.

30. The reaction product of a finely-divided, hydrated, precipitated siliceous pigment having an average ultimate particle size below 0.1 micron and N,N-diallylmelamine.

31. The reaction product of a finely-divided, hydrated, precipitated silica having a surface area of 25 to 250 square meters per gram and an average ultimate particle size below 0.1 micron and beta-propiolactone.

32. The reaction product of a finely-divided, hydrated, precipitated silica having a surface area of 25 to 250 square meters per gram and an average ultimate particle size below 0.1 micron and N,N-diallylmelamine.

33. The reaction product of a finely-divided, hydrated, precipitated silica which contains at least 75 percent $SiO_2$ on the water-free basis and bound water in an amount corresponding to the formula $H_2O \cdot (SiO_2)_x$, where $x$ is 3 to 85, and which has a surface area of 25 to 250 square meters per gram and an average ultimate particle size below 0.1 micron, and beta-propiolactone.

34. The reaction product of a finely-divided, hydrated, precipitated silica which contains at least 75 percent $SiO_2$ on the water-free basis and bound water in an amount corresponding to the formula $H_2O \cdot (SiO_2)_x$, where $x$ is 3 to 85, and which has a surface area of 25 to 250 square meters per gram and an average ultimate particle size below 0.1 micron, and N,N-diallylmelamine.

35. A composition which comprises a rubber of the group consisting of natural rubber, butadiene-styrene copolymers, butadiene-acrylonitrile copolymers, 2-chlorobutadiene polymers and isobutylene polymers, a finely-divided, hydrated siliceous pigment having an average ultimate particle size below 0.1 micron, said pigment being treated with a member selected from the group consisting of a lactone and a triazine.

36. The method of producing a siliceous pigment suitable as a rubber-reinforcing pigment which comprises mixing a member selected from the group consisting of a lactone and a triazine with a finely-divided, hydrated, precipitated siliceous pigment having a surface area of 25 to 250 square meters per gram and an average ultimate particle below 0.1 micron.

37. The method which comprises treating with a member selected from the group consisting of a lactone and a triazine, a finely-divided hydrated silica having an average ultimate particle size below 0.1 micron and a surface area of 25 to 250 square meters per gram and milling the treated product in a rubber of the group consisting of natural rubber, butadiene-styrene copolymers, butadiene-acrylonitrile copolymers, 2-chlorobutadiene polymers and isobutylene polymers.

38. The reaction product of a finely-divided, hydrated, precipitated siliceous pigment having an average ultimate particle size below 0.1 micron and a member selected from the group consisting of a lactone and a triazine.

References Cited in the file of this patent

UNITED STATES PATENTS

| 2,560,043 | Schmidt | July 10, 1951 |
| 2,657,149 | Iler | Oct. 27, 1953 |
| 2,663,650 | Iler | Dec. 22, 1953 |
| 2,680,722 | Anderson | June 8, 1954 |
| 2,692,870 | Pechukas | Oct. 20, 1954 |
| 2,739,076 | Iler | Mar. 20, 1956 |
| 2,739,078 | Broge | Mar. 20, 1956 |

UNITED STATES PATENT OFFICE
CERTIFICATE OF CORRECTION

Patent No. 2,892,807                    June 30, 1959

John W. Sellers et al

It is hereby certified that error appears in the printed specification of the above numbered patent requiring correction and that the said Letters Patent should read as corrected below.

Column 4, line 14, for "silicate" read -- silica --; column 6, line 73, for "Examples III", in italics, read -- Example III -- in italics; column 9, line 72, after "polymers," insert -- and --; column 10, line 18, strike out "of" after "size".

Signed and sealed this 29th day of March 1960.

(SEAL)
Attest:

KARL H. AXLINE                           ROBERT C. WATSON
Attesting Officer                      Commissioner of Patents